United States Patent [19]

Martineau

[11] 4,241,590
[45] Dec. 30, 1980

[54] AUGER FLIGHT FOR COMESTIBLE FREEZER
[75] Inventor: Tom N. Martineau, Kiel, Wis.
[73] Assignee: Stoelting, Inc., Kiel, Wis.
[21] Appl. No.: 4,639
[22] Filed: Jan. 19, 1979
[51] Int. Cl.³ .............................................. A23G 9/00
[52] U.S. Cl. ..................................... 62/343; 62/354; 366/320
[58] Field of Search ........................ 366/144, 149, 320; 62/342, 343, 354; 165/94

[56] References Cited
U.S. PATENT DOCUMENTS

| | | | |
|---|---|---|---|
| 1,755,021 | 4/1930 | Pfouts | 62/343 X |
| 3,222,035 | 12/1965 | Lutz et al. | 62/342 X |
| 3,675,904 | 7/1972 | Bremmer | 366/320 |
| 3,781,132 | 12/1973 | Latinen | 366/144 X |
| 3,946,997 | 3/1976 | Grenzebach | 366/320 |
| 3,958,968 | 5/1976 | Hosaka | 366/144 X |

Primary Examiner—Albert J. Makay
Assistant Examiner—William E. Tapolcai, Jr.
Attorney, Agent, or Firm—Wheeler, Morsell, House & Fuller

[57] ABSTRACT

A comestible freezer has a freezing barrel with a cold wall, an input end and an output end and a feeder therewithin having a ribbon auger flight helix and a stationary blending bar within the helix. A portion of the ribbon auger flight helix has an outward twist or skew diverging from a radial plane through the axis of the helix and outwardly toward the barrel wall whereby to exert a component of thrust on the comestible toward the cold wall. A portion of the ribbon also has an inward twist or skew diverging from the radial plane and inwardly toward the blending bar whereby to exert a component of thrust on the comestible toward the bar.

9 Claims, 7 Drawing Figures

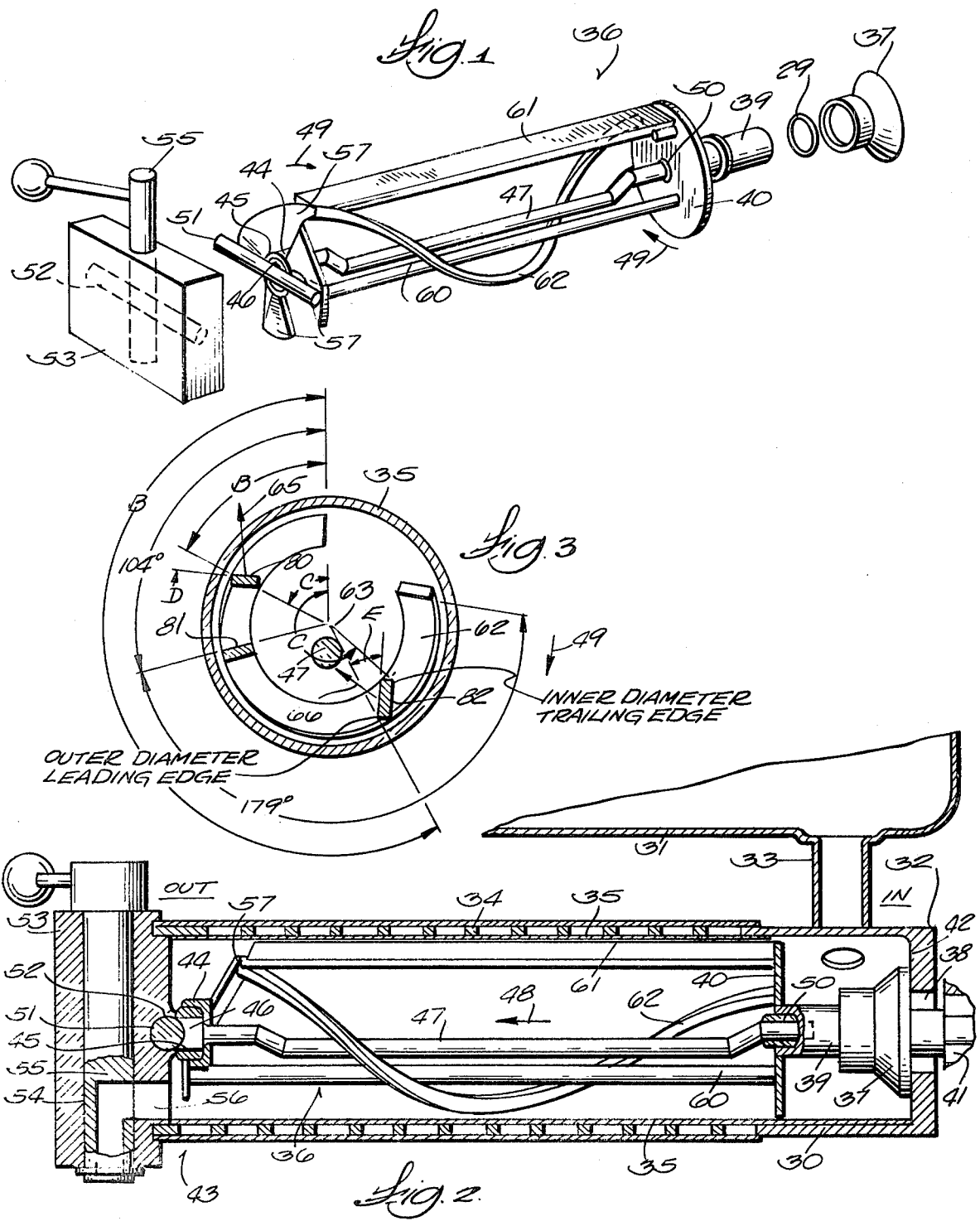

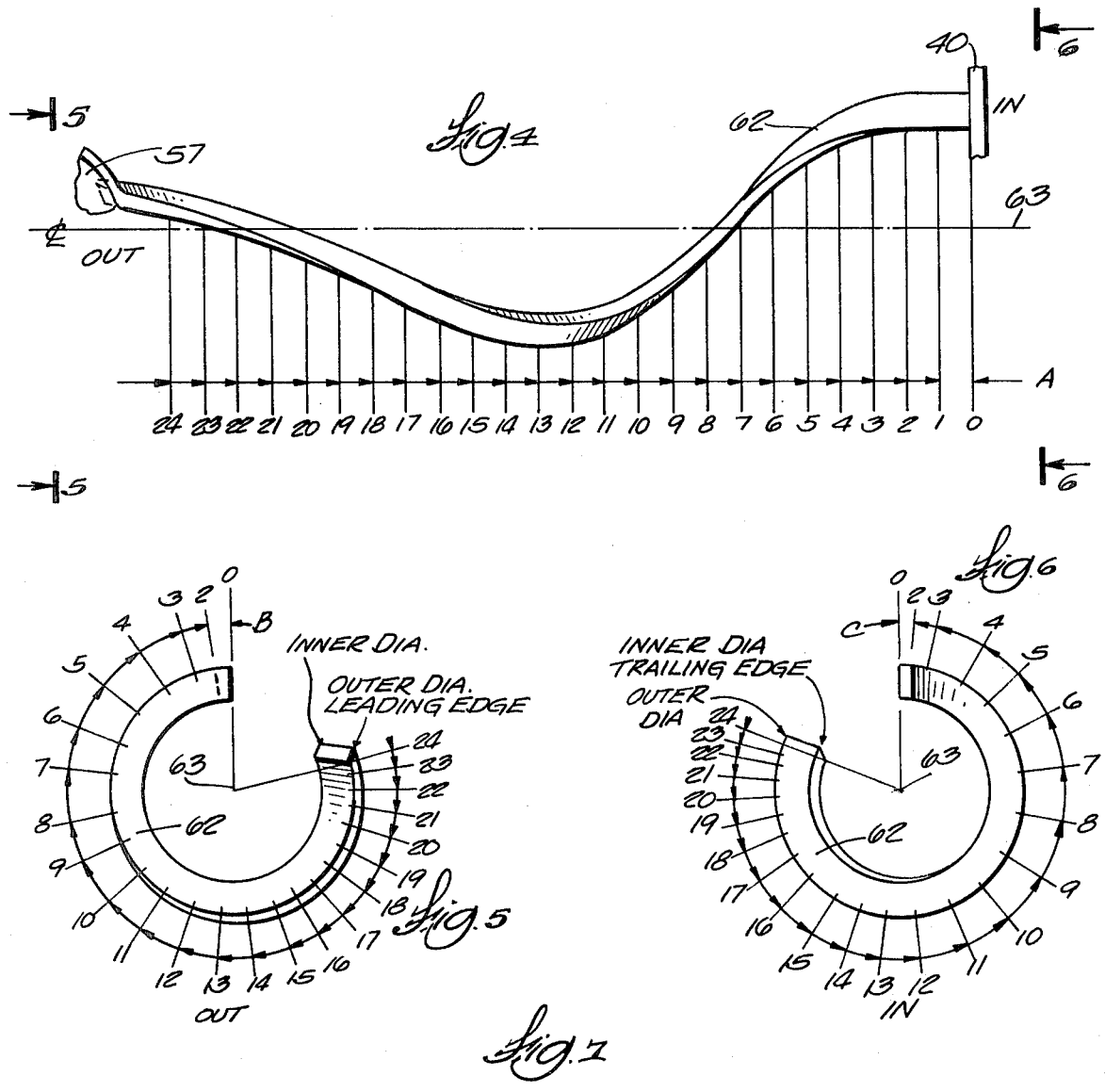

AUGER FLIGHT FOR COMESTIBLE FREEZER

BACKGROUND OF THE INVENTION

Prior U.S. Pat. Nos., such as 2,746,730 and 2,924,952, show prior art auger flight feeders in the freezing chamber of comestible freezers. In such prior art devices, the auger ribber flight helix has the entire length of its flat impelling face disposed in a plane which intersects the axis of the helix. Accordingly, such prior auger flights merely impel the comestible axially in the freezer barrel with no radial component of force.

SUMMARY OF THE INVENTION

In accordance with the present invention, one or more portions of the auger ribbon flight helix are twisted or skewed with respect to a radial plane through the axis of the helix, thus to impose a radial thrust component on the comestible and achieve advantages not achieved in the prior art devices. In accordance with the present invention, a portion along the length of the ribbon flight helix is provided with an outward twist or skew, whereby the skewed flight exerts an outward component of thrust on the comestible toward the cold wall of the freezer barrel to enhance heat transfer from the comestible to the cold wall and promote the freezing process. In preferred embodiments of the invention, such an outward twist or skew is provided along that portion of the auger flight length near the input end of the auger feeder in order to enhance freezing of the comestible immediately after its admission to the freezing barrel.

Another portion along the length of the ribbon flight helix is also provided with an inward twist or skew to exert an inward component of thrust on the comestible toward a fixed blending bar within the helix, thus to promote kneading, blending and mixing of the ingredients of the comestible. In preferred embodiments of the invention, the inward twist or skew is provided in that portion of the length of the auger flight which is near the output end of the auger feeder. Accordingly, the comestible is first thrust outwardly against the cold wall of the barrel in the early stages of its travel through the barrel and is thus thrust inwardly against the blending bar in the later stages of its travel through the freezing barrel. In preferred embodiments, the outward twist or skew extends along about one-third of the length of the ribbon flight helix, and the inward twist or skew extends along about two-thirds of the length of the ribbon flight helix.

Accordingly, comestible freezers embodying the present invention will have improved actions both from the standpoint of rapid and effective removal of heat from the comestible shortly after the comestible enters the freezing barrel and it will thereafter be more effectively kneaded, blended and mixed en route to the discharge spout.

Other objects, features and advantages of the invention will appear from the disclosure hereof.

DESCRIPTION OF THE DRAWINGS

FIG. 1 is a fragmentary and partially exploded perspective view of an auger feeder embodying the present invention, in axially spaced relation to the freezer chamber outlet door.

FIG. 2 is a vertical longitudinal section through such an auger feeder incorporated in the freezing barrel of a comestible freezer.

FIG. 3 is a composite cross section taken through the barrel of FIG. 2 and illustrating the twist or skew of the ribbon flight helix at various points along the length of the helix.

FIG. 4 is a side view of the helix alone, showing datum points or positions along its length which are related to the table of FIG. 7.

FIG. 5 is an end view of the helix of FIG. 4 taken along the line 5—5 of FIG. 4 and showing the front face of the flight and the previously mentioned datum points along its length at the leading edge of its outermost diameter.

FIG. 6 is an end view of the helix taken along the line 6—6 of FIG. 4 and showing the rear face of the flight and the previously mentioned datum points along its length at the trailing edge of its innermost diameter.

FIG. 7 is a table relating the twist or skew angles of the auger flight helix and the helix angles of its front and rear faces to the previously mentioned datum points.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 2 shows the assembly in a comestible freezer of a cylindrical freezing barrel 30 supplied with a liquid comestible mix from a feeding tank 31. The liquid mix in tank 31 is supplied to the input end 32 of the barrel 30 through fill tube 33. Barrel 30 is provided along its wall 35 with evaporator coils 34 from a refrigerator apparatus (not shown) which cools the cylindrical wall 35 of barrel 30.

Coaxial with cylindrical barrel wall 35 is an auger feeder 36 which is also shown in FIG. 1. The auger feeder 36 has a drive shaft 39 rotatably mounted externally of barrel 30 on bearing 41. Rubber or plastic seal 37 and O-ring 29 seals barrel wall opening 38 through which the drum shaft 39 extends. The space in barrel 30 between plate 40 and barrel end wall 42 constitutes a fill chamber into which liquid comestible mix from tank 31 is fed. The auger feeder 36 feeds the liquid mix through the barrel 30 in the direction of arrow 48 where it is exposed to the freezer wall 35 to convert the liquid mix into a semi-frozen comestible having a soft-serve consistency. The ingredients of the mix are also blended and mixed with each other and with air in the barrel 30 to achieve the desired consistency.

At the output or discharge end 43 of barrel 30, there is an end block or door 53 on which the auger feeder is rotatably mounted. The discharge end of feeder 36 has an end bearing hub 44 rotatably supported on a bushing 45 which is rotatably mounted on a bearing boss 46 at one end of a stationary or fixed blending bar 47. The other end of blending bar 47 is supported from bushing 50 received in a hollow bore of the drive shaft 39.

Each bearing boss 46 of the blending rod 47 is supported on a transverse support or locating bar 51 which is received within a transverse groove 52 in the end block or door 53 which closes the end 43 of the barrel 30. End block or door 53 has a vertical bore 54 which carries a rotatable dispensing valve 55 which dispenses frozen comestible from the barrel 30 through discharge duct 56 in the block 53.

Auger feeder end bearing hub 44 also carries propeller blades 57 to discharge comestible through duct 56. Bearing hub 44 is connected to the disk 40 by a rigid stay bar 60 which has a blending action when it rotates around the blending bar 47. One of the propeller blades 57 is connected to disk 40 by a scraper blade 61 and by an auger ribbon flight helix 62. Accordingly, the auger feeder 36 is rotatably supported at one end on its bearing hub 44 from bushing 45 and the stationary bearing boss 46 on the end of fixed blending bar 47 and at its other end on its drive shaft 39 from external bearing 41. Blending bar 47 is within the auger flight helix 62 and is held against turning by its transverse anchor or support bar 51 seated in door groove 52. A motor (not shown) is attached to the drive shaft 39. When the motor is energized, the auger feeder 36 rotates in the direction of arrow 49 (FIG. 1) to impel comestible from the input end 32 of the barrel 30 toward its output end 43 for dispensing through the duct 56. Scraper blade 61 scrapes away comestible which tends to freeze on the cold wall 35.

In accordance with the present invention, the auger ribbon flight helix 62 is twisted or skewed for the purposes hereinbefore stated. The ribbon flight 62 typically comprises a flat strip of stainless steel which in the prior art has its flat side continuously disposed on a radial plane through the axis 63 of the helix. In accordance with the present invention, however, the flat strip of the flight is twisted or skewed with respect to a radial plane through the axis 63 for the purposes aforestated.

FIG. 4 indicates datum points or positions 0-24, inclusive, along the axis of the helix from the end of strip 62 connected to the plate 40 to its end connected to end bearing hub 44 through propeller blades 57. In one embodiment of the invention, the datum points or positions 0-24, inclusive, are spaced apart one-half inch each, and this parameter is given reference character A in the table of FIG. 7.

From position 0 to position 8, the flat auger flight helix 62 is provided with an outward twist or skew illustrated at 80 in FIG. 3. The amount of outward twist or skew is indicated by skew angle D in FIG. 3 and is indicated by parameter D in table 7 for positions 0-8, inclusive, in which angle D varies from 0° to 12°. At approximately position 8, the ribbon flight is disposed on a radial plane through the axis 63, as indicated at 81 in FIG. 3.

Parameter B in FIGS. 5 and 7 gives the helix angle in degrees of the leading edge of the outer diameter of the ribbon auger flight 62 for each of positions 0-24, inclusive.

Parameter D in FIGS. 3 and 7 gives the outward skew angle in degrees of the front face of auger ribbon flight 62 for each of positions 0-8, inclusive. Along this portion of the auger flight length, the flight is skewed or twisted out of a radial plane through the axis 63, thus to face the front face of the auger outwardly by an amount indicated by angle D in FIGS. 3 and 7. As seen from FIGS. 3 and 7, the skew angle D is "out" for approximately 104° of the helical turn of the auger flight 62. From positions 9-24, angle D would be negative and is not indicated for parameter D of FIG. 7.

Parameter E in FIGS. 3 and 7 gives the inward skew angle in degrees over that portion 82 of the front face of the auger ribbon flight 62 which is twisted to face inwardly from positions 9-24, inclusive. The helical turn of auger flight 62 through which angle E is positive is approximately 179°, as indicated in FIGS. 3 and 7. From position 0-8, inclusive, angle E would be negative and is not indicated for parameter E in FIG. 7.

The foregoing specific parameters are given solely for illustrative purposes, as they relate to a specific embodiment of the invention. Other embodiments may have different parameters, depending upon circumstances.

As is clear from FIGS. 3 and 7, where the skew angle D is positive, the ribbon flight 62 has an outward twist or skew. This results in a component of force exerted by this portion 80 of the auger on the comestible in the direction of arrow 65 in FIG. 3 and toward the cold wall 35. Over that portion 82 of the length of the auger flight 62 where angle E is positive, the twist or skew of the flight forces the comestible inwardly in the direction of arrow 66 in FIG. 3 toward the blending bar 47.

Accordingly, after the liquid comestible is first admitted to the freezing chamber and is near its input end 32, skewed auger flight 62 in its portion 80 will have a component of force exerted on the comestible to urge it toward the cold wall 35 to promote freezing thereof. At approximately position 8 where the flight lies on a radial plane through the cylinder axis 63, as indicated by flight portion 81 in FIG. 3, the thrust of the auger flight is axially directed along the barrel with no inward or outward component. Over that portion 82 of the length of the ribbon flight auger 62 from position 9 to position 24, the flight exerts an inward component of force on the comestible to urge it toward the stationary blending or kneading bar 47 to enhance blending and mixing of the ingredients of the comestible.

Comestible freezers embodying the present invention will achieve the objectives hereinbefore set forth. Variations in the skew angle can be made to achieve variations in the objectives above mentioned. For example, if it is desired to continuously thrust the comestible against the cold wall 35, skew angle D would be positive for a much longer portion of the length of the auger flight, indeed, for its entire length, if desired. In that event, skew angle E would be negative for all positions therealong. If it is desired to force the comestible against the blending bar 47 over the entire length of the feeder, skew angle E would be positive for all positions along the bar and skew angle D would be negative for all such positions. Any variation between these two extremes can be utilized to achieve desired objectives. However, in the specifically illustrated embodiment, the major portion (specifically two-thirds) of the axial length of the auger ribbon flight is skewed inwardly at angles E. A minor portion (specifically one-third) of the axial length of the auger ribbon flight is skewed outwardly at angles D.

I claim:

1. In a comestible freezer having a freezing barrel with a cold wall, said barrel having an input end and an output end and a feeder therewithin having an auger ribbon flight helix, the improvement in which the ribbon of said flight helix has an outward skew diverging from a radial plane through the axis of the helix and outwardly toward the barrel wall whereby to exert a component of thrust on the comestible toward said wall and in which said freezer has a blending bar within said helix, the ribbon of said flight helix having a portion with an inward skew diverging from said radial plane and inwardly toward said blending bar whereby to exert a component of thrust on the comestible toward said bar.

2. The invention of claim 1 in which said outward skew extends along a portion of said helix from the input end of the barrel toward its output end and said inward skew extends along a portion of said helix from the output end of the barrel toward its input end whereby comestible near said input end is subject to a component of thrust toward the cold wall of the barrel and comestible near said output end is subject to a component of thrust toward said blending bar.

3. The invention of claim 2 in which said inward skew has a greater axial extent than said outward skew.

4. The invention of claim 2 in which said outward skew extends along approximately one-third the axial length of the helix and the inward skew extends along approximately two-thirds the axial length of the helix.

5. In a comestible freezer having a freezing barrel with an input end and an output end and a feeder therewithin having an auger ribbon flight helix and a blending bar within said helix, the improvement in which the ribbon of said flight helix has an inward skew diverging from a radial plane through the axis of the helix and inwardly toward the blending bar whereby to exert a component of thrust on the comestible toward said bar and in which said barrel has a cold wall, the ribbon of said flight helix having an outward skew diverging from said radial plane toward the barrel wall whereby to exert a component of thrust on the comestible toward said wall.

6. The invention of claim 5 in which said outward skew extends along a portion of said helix from the input end of the barrel toward its output end and said inward skew extends along a portion of said helix from the output end of the barrel toward its input end whereby comestible near said input end is subject to a component of thrust toward the cold wall of the barrel and comestible near said output end is subject to a component of thrust toward said blending bar.

7. In a comestible freezer having a freezing barrel and a feeder therewithin having an auger ribbon flight helix, the improvement in which the ribbon of the flight helix is skewed with respect to a radial plane through the axis of the helix whereby to exert a radial component of thrust on the comestible and wherein approximately $\frac{1}{3}$ of the length of the ribbon is skewed outwardly at an angle of 2° to 12° with respect to a radial plane and the remaining portion of the ribbon is skewed inwardly at an angle of 14° to 33° with respect to a radial plane.

8. The invention of claim 7 in which the freezer has a fixed blending bar within said helix, and said inwardly skewed portion exerts a component of thrust on said comestible toward said bar.

9. In a comestible freezer having a freezing barrel with an input end and an output end and a feeder therewithin having an auger ribbon flight helix, the improvement in which the ribbon of the flight helix is skewed with respect to a radial plane through the axis of the helix whereby to exert a radial component of thrust on the comestible and in which the freezer has a fixed blending bar within said helix, said flight ribbon being skewed inwardly toward said blending bar for a portion of its length adjacent the output end whereby to exert a component of thrust on said comestible toward said bar, and in which the freezer has a cold wall, a portion of the flight ribbon adjacent the input end being skewed outwardly toward said cold wall whereby to exert a component of thrust on said comestible toward said cold wall.

* * * * *